March 12, 1940.                    G. H. BOYD                    2,193,220
                                  LINE SPACER
                              Filed July 23, 1937              5 Sheets-Sheet 1

Inventor
George H. Boyd
By Blackmore, Spencer & Flint
Attorneys

March 12, 1940.   G. H. BOYD   2,193,220
LINE SPACER
Filed July 23, 1937   5 Sheets-Sheet 2

Inventor
George H. Boyd
By Blackmore, Spencer & Flint
Attorneys

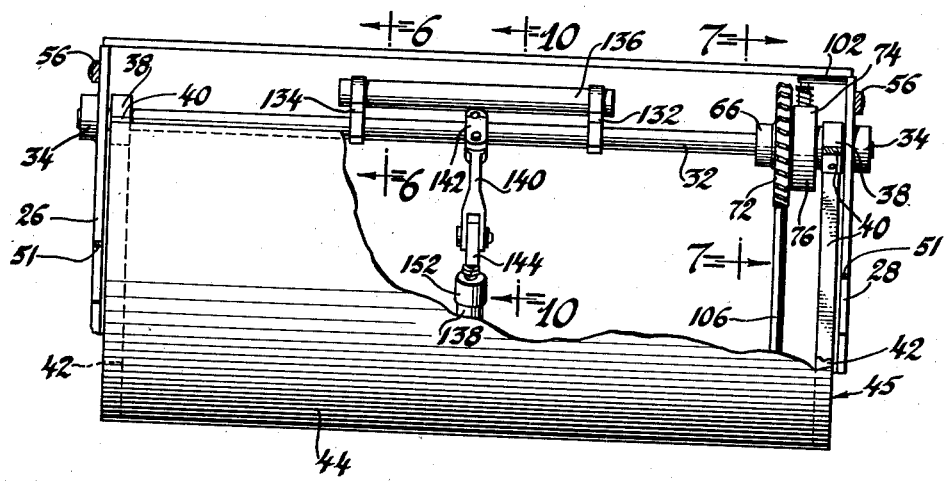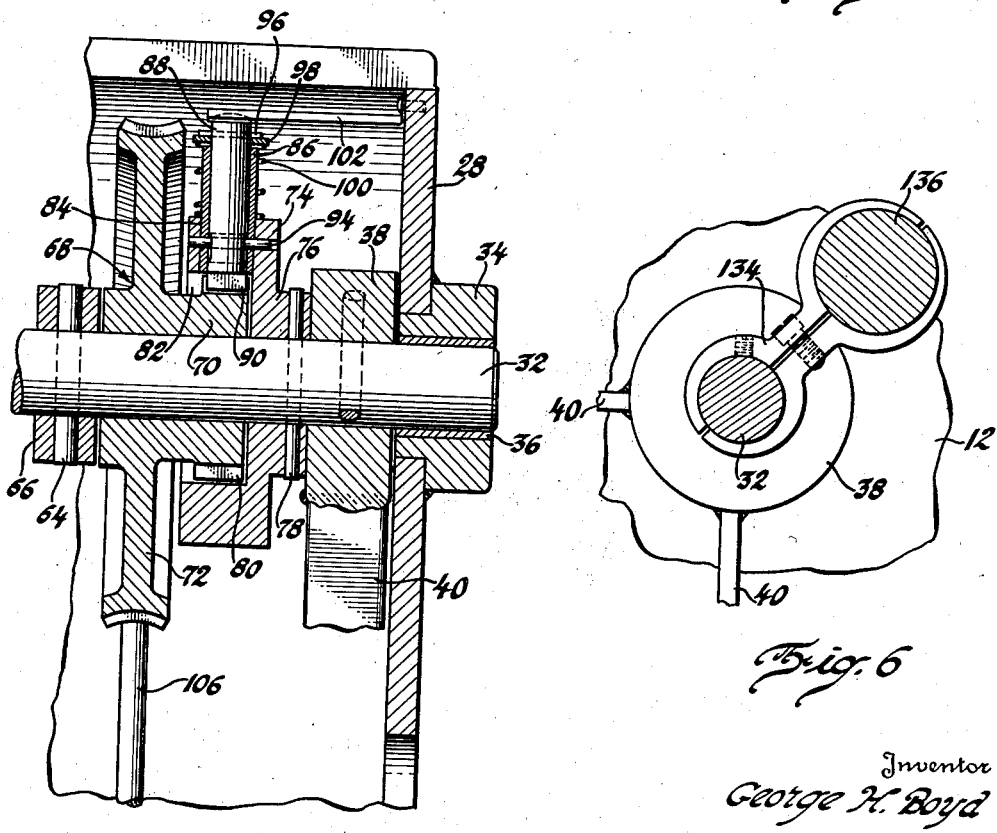

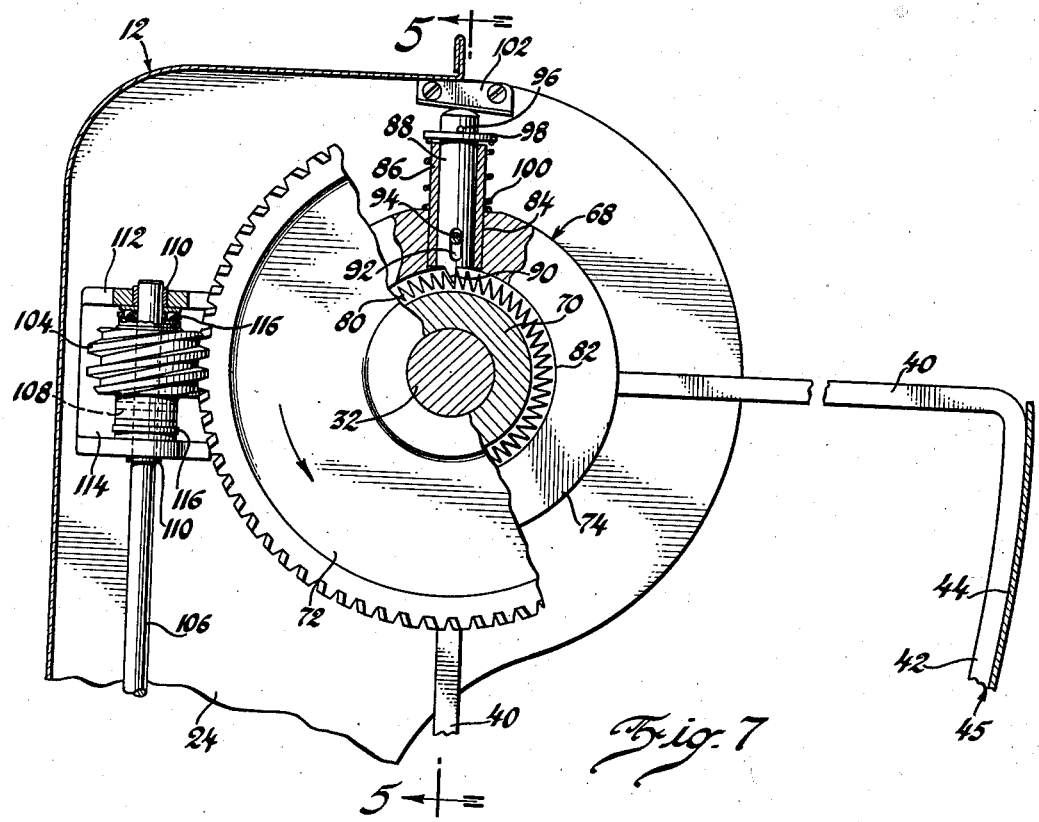
Fig. 7
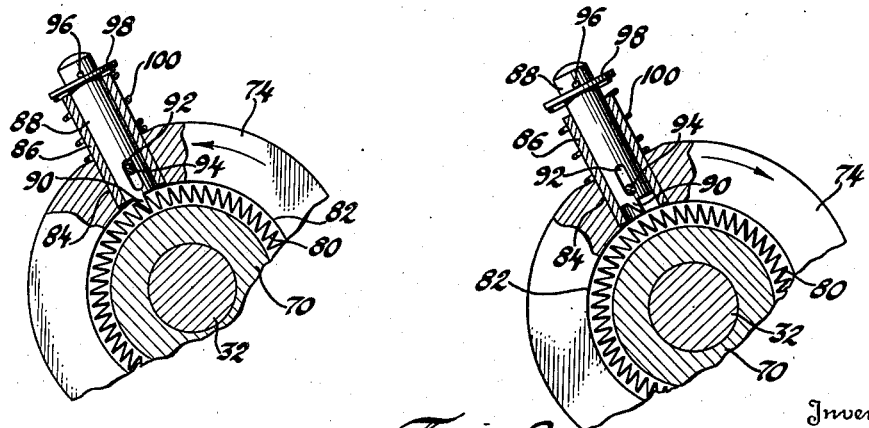
Fig. 8
Fig. 9
Inventor
George H. Boyd

March 12, 1940.　　　　G. H. BOYD　　　　2,193,220
LINE SPACER
Filed July 23, 1937　　　5 Sheets-Sheet 5

Inventor
George H. Boyd
By Blackmore, Spencer & Flint
Attorneys

Patented Mar. 12, 1940

2,193,220

UNITED STATES PATENT OFFICE 2,193,220

LINE SPACER

George H. Boyd, Detroit, Mich., assignor to Ternstedt Manufacturing Company, Detroit, Mich., a corporation of Michigan Application July 23, 1937, Serial No. 155,168

8 Claims. (Cl. 120—31)

This invention relates to a line spacing or copyholding machine of the type in which but one line of the copy is shown at a time.

The introduction of the Social Security Act has greatly increased the keeping of records in the various industrial plants in the country and has necessitated a great deal of transferring of records from one sheet to another, and to facilitate this transferring of records and to enable the operator accurately to transfer records from one sheet to another, the machine of the present invention was designed and worked out. The machine has a 90° segment the front part of which is covered by a shield to leave but one line exposed at the top. After copying a line the operator—by moving the segment a short distance—is able to expose a new line to view to be transferred to a different sheet. When the segment has been moved so as to expose all the lines on the sheet and the operator has copied each, the segment may be caused to fall and resume its starting position by giving a rapid reverse rotation to the handle which operates the mechanism for moving the segment. A suitable clutch positioned in the mechanism is so constructed that a slow movement in one direction will enable the mechanism to raise the segment to expose a new line while a slow reverse movement will turn the segment in the opposite direction. A rapid movement of the clutch mechanism in a direction reverse to the raising of the segment will cause the clutch to operate to release the segment and cause it to fall to its original or starting position.

On the drawings

Figure 4 is a view of the upper part of Figure 1 with parts broken away better to illustrate the construction, and taken on the line 4—4 of Figure 3.

Figure 5 is an enlarged sectional detail view of the clutch and associated mechanism.

Figure 6 is a section on the line 6—6 of Figure 4 showing the counterweight.

Figure 7 is a detailed view on the line 7—7 of Figure 4, parts being broken away and others shown in section better to illustrate the construction.

Figures 8 and 9 are different sectional views of the clutch with the pin in its two extreme positions.

Figure 1:
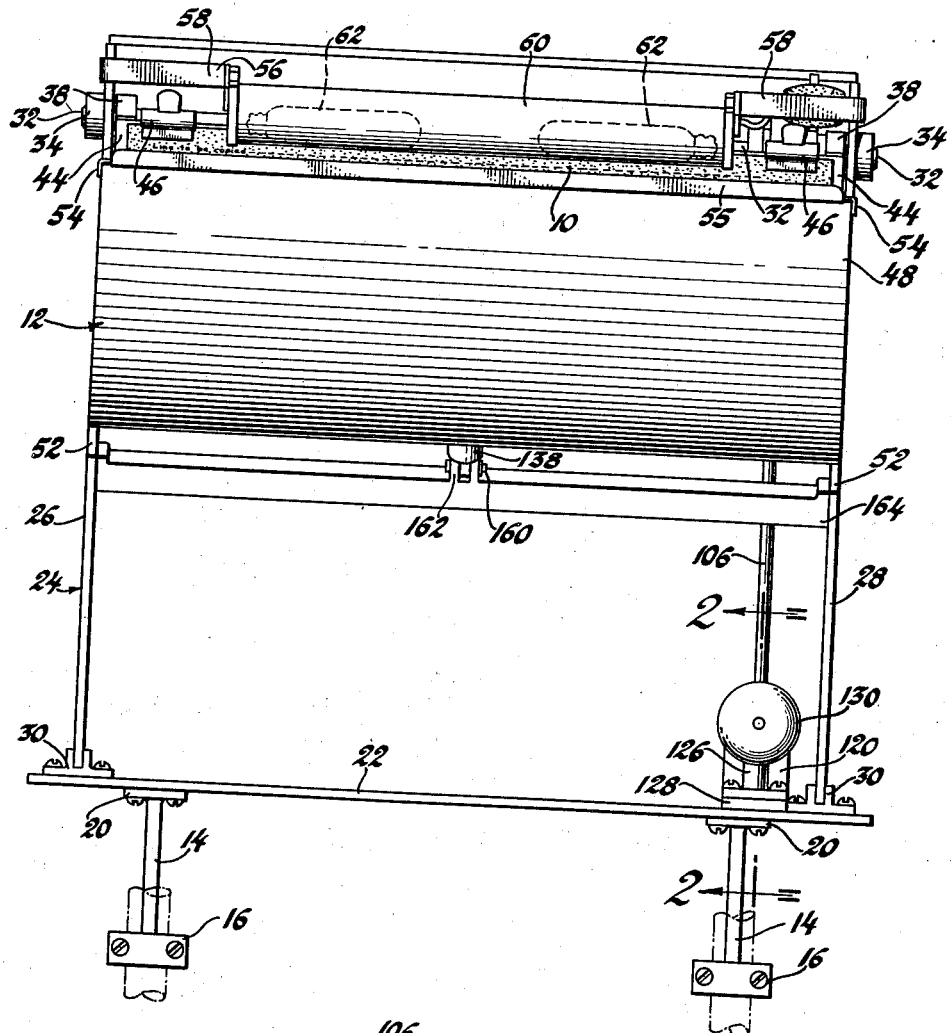
Figure 1 is a front view of the machine as it faces the operator.
Figure 2:
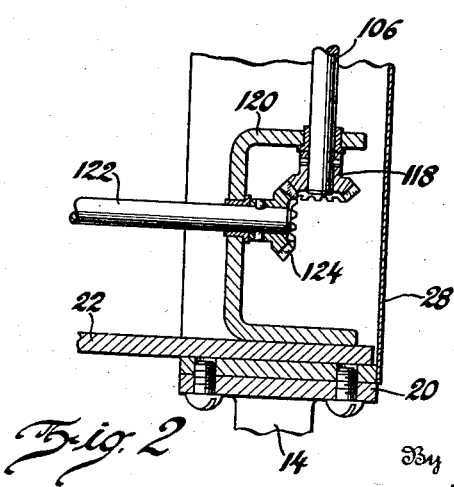
Figure 2 is a section on the line 2—2 of Figure 1.
Figure 3:
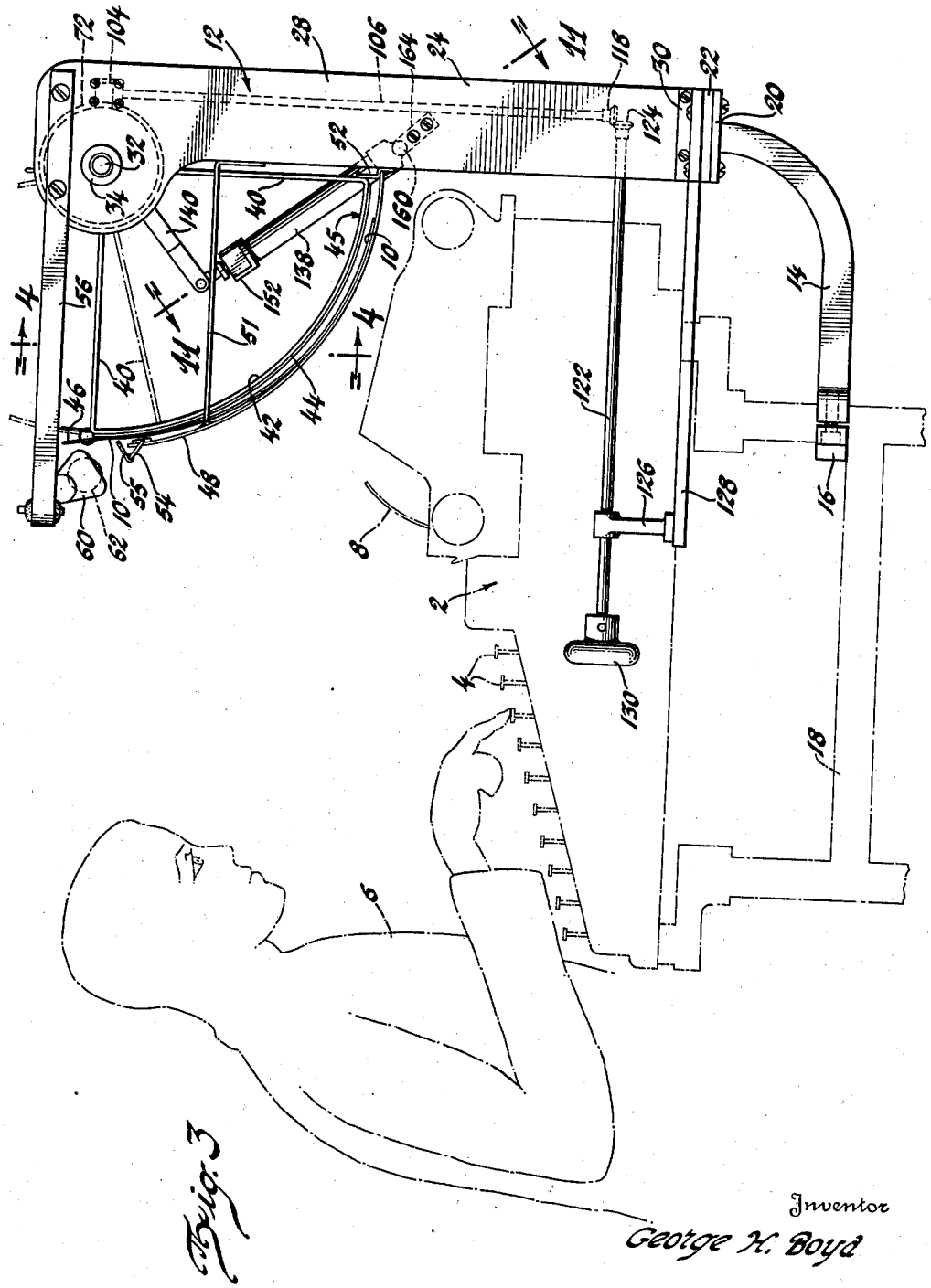
Figure 3 is a side view of the structure of Figure 1 showing the line spacing machine attached to a business machine with the operator shown in position.
Figure 10:
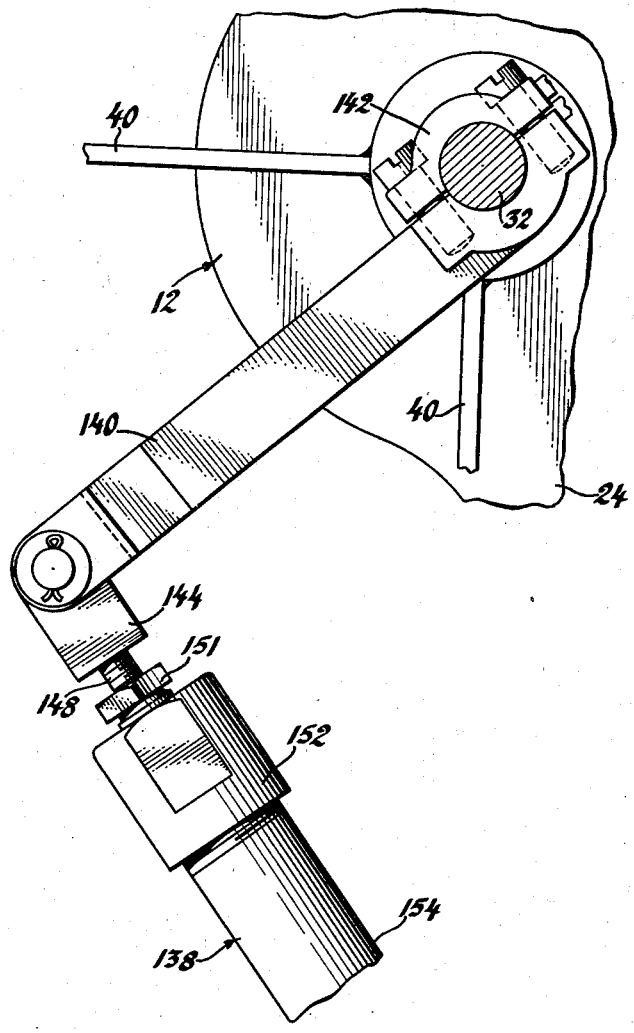
Figure 10 is a detail view on the line 10—10 of Figure 4.

On the drawings there is shown at 2 in dotted outline in Figure 3 a suitable type of business machine having keys 4 which are adapted to be pressed by the operator 6. The machine 2 is adapted to receive a sheet of paper 8 on which there is to be recorded the suitable records to be transferred from the sheet 10 which is mounted on the line spacing machine indicated as a whole at 12. The machine 12 has the arms 14 at its lower part, the arms 14 being secured as at 16 to a base 18 on which the machine 2 is secured. The arms 14 are curved as shown in Figure 3 and have plates 20 secured at the upper extremities and on these plates there is mounted the base 22 of an upright frame 24 the sides of which are indicated at 26 and 28. The sides 26 and 28 are mounted by means of the feet 30 to the base 22.

At the upper end of the sides 26 and 28 there is journaled the shaft 32, best shown in Figures 4 and 5. The sides 26 and 28 have the retainers 34 mounted therein in which there are positioned the bearings 36 in which the shaft 32 rotates.

The shaft 32 has fixedly secured at its extreme ends just inside the sides 26 and 28 the hubs 38 of arms 40 which project toward the operator and have their outer ends continued toward each other to form an arc 42. The arcs 42 have a curved plate 44 secured thereto and shaped to conform to the arcs 42 so that the arms 40, arcs 42, and plate 44 form a segment 45 to receive the sheet 10 to be copied. The sheet 10 is held on plate 44 by means of removable clips 46 which may be of any suitable type.

An arcuate shield 48 is positioned immediately in front of the segment 45 and is secured at its upper end by the braces 51 and at its lower end to brackets 52 secured to the sides 26 and 28. If desired, but a single bracket 52 may be used and extend entirely across the machine from one side 26 to the other side 28. The shield 48 conforms in shape to the plate 44 and at its upper end has secured thereto the arms 54 on which there is pivoted the line indicator 55 which extends inwardly and is spaced from the sheet 10 to indicate the line to be copied. The upper part of the frame 12 has secured at each side the arms 56 which are inwardly bent at the front end as indicated at 58 and retain therebetween the shade or frame 60 in which there are received the electric light bulbs 62 which illuminate the sheet 10 to be copied.

Referring to Figure 5, the shaft 32 has secured thereto by means of the pin 64 a collar 66 which retains the clutch 68 in the position shown in Figure 5. The clutch comprises the externally toothed extension 70 on the hub of the worm wheel 72, the extension 70 and wheel 72 being freely mounted on the shaft 32. The clutch element 70 is surrounded by a second clutch element or part 74 which has a hub 76 secured to the shaft 32 by means of the pin 78. The clutch part 74 is not toothed or notched where it overlaps the toothed part of the clutch element 70 but is smooth on its interior.

Referring to Figures 5, 7, 8, and 9, the teeth on the clutch element or part 70 are indicated by the numeral 80 while the smooth interior clutch part 74 is indicated by the numeral 82. The clutch element or part 74 has an opening 84 therein in which there is rigidly mounted the cylinder 86, in which there is slidably received the pin 88, having a single tooth 90 at its inner end, the tooth 90 being adapted to mesh with the spaces between the teeth 80 on the element 70. The pin 88 has a slot 92 to accommodate a retaining pin 94 secured in the clutch element 74. A second retaining pin 96 at the outer end of the pin 88 holds a washer 98 in place and a weak coil spring 100 surrounds the cylinder 86 and is held in place by the washer 98 between the washer and the face of the clutch element 74. In Figures 7 and 8 the tooth 90 is shown in engagement with the teeth 80 of the clutch element 70, while in Figure 9 the spring 100 has pushed the pin 88 outwardly to cause the tooth 90 to be disengaged from the teeth 80. The reason for this disengagement will be later described.

At the upper part of the frame 12 and immediately over the pin 88 when the segment 45 is in its lowermost position there is secured a finger 102 which causes the pin 88 to be positioned inwardly to the position shown in Figure 7 so that when the segment 42 returns to its lowermost position the pin 88 will always be forced by the finger 102 into engagement with the teeth 80 of the clutch element 70.

The worm wheel 72 meshes with a worm 104 secured to the end of a shaft 106 by means of the pin 108. The shaft 106 has its upper end mounted in bearings 110 formed in the arms 112 of the U-shaped bracket 114 secured to the frame 24. Suitable ball bearings 116 are positioned inside the U bracket 114 between the worm 104 and the bearings 110.

The shaft 106 extends downwardly toward the base 22 of the machine and has a miter gear 118 secured to its end. The shaft 106 adjacent the gear 118 is mounted in the U bracket 120 secured to the base of the machine. A second shaft 122 is also mounted in the U bracket 120 and has secured thereto a miter gear 124 mating with the gear 118. The shaft 122 extends forwardly of the machine and has its end mounted in an upright 126 secured to an arm 128 projecting from the base of the machine. A handle 130 provided at the end of the shaft 122 adjacent the operator serves as a means for operating the line spacer structure.

In order to make the machine easier of operation the shaft 32 has secured thereto two arms 132 and 134 shown in detail in Figure 6. Between the arms 132 and 134 there is mounted a counterweight 136. The counterweight 136 is not heavy enough completely to balance the segment 45 and when free to move, the segment will move downwardly and bring the parts to the position shown in Figures 3 and 4.

Figure 11:
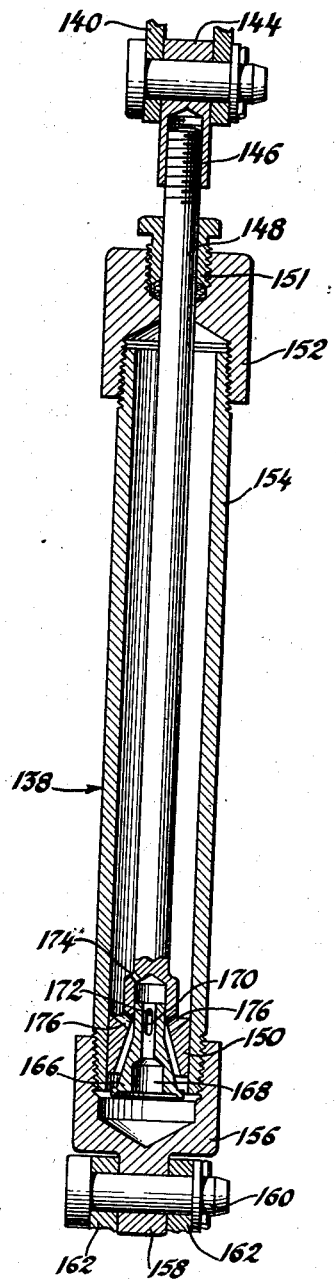
Figure 11 is a sectional detailed view through the dashpot.

In order to prevent a sudden jar and to eliminate noise a dashpot 138 is provided. The dashpot is positioned inside the segment and between the segment and the rear of the upright frame 24, and comprises an arm 140 rigidly secured to the shaft 32 as shown at 142. The end of the arm 140 has pivoted thereto the head 144 to which there is threaded as at 146 the end of a rod 148 having a piston or plunger 150 at its bottom. The rod 148 passes through a suitable packing gland 151 mounted at the head 152 on a cylinder 154. The other end of the cylinder has the head 156 provided with a tongue 158 pivoted on a pin 160 mounted in ears 162 formed on a transverse brace 164 extending from one side 26 to the other side 28 of the frame. The plunger or piston 150 has the movable valve head 166 provided with a passage 168 through its center. The valve 166 is conical at its bottom and cylindrical at its top and the cylindrical part has a slot 170 in which there is received pin 172 passing through the piston 150. The slot 170 and pin 172 limit the free movement of the valve 166. The bore of the piston in which the cylinder part of the valve travels is provided with one or more openings 174 to allow the escape of oil from the underside of the piston shown in Figure 11 to the upper side and into the cylinder. The piston is also provided with a plurality of openings 176 to allow the escape of oil between the conical part of the valve 166 and its conical seat in the piston 150. When the segment 45 is returned from elevated position to lowered position, the piston 150 will move substantially free in the cylinder, the oil flowing freely through the passages 174 and 176. Just before the piston reaches the lowest point of its travel the valve 166 will strike the bottom of the cylinder and cause the conical part thereof to approach and be seated on the conical seat in the piston 150. This will obstruct the flow of oil through the passages 176 and force all the oil to flow through the passages 168 and 174 and greatly retard the downward movement of the segment. Therefore, as the segment reaches its lowermost position it is suddenly and lightly retarded with a dashpot action and it falls to its starting or lowermost position noiselessly and without jar.

Referring to Figure 7, the position of the parts when the segment 45 is in its lowermost position is shown. The finger 102 has forced the pin 88 inwardly toward the shaft 32 and has caused the tooth 90 to engage between the teeth 80 of the clutch element 70. The frictional engagement between the teeth 80 and 90 is sufficient to hold the teeth in the position shown in Figures 7 and 8. By turning the operating handle 130 the operator causes the rotation of the worm wheel 72 which in turn moves the clutch 68 and the shaft 32. After a very short arcuate movement the pin 88 will leave the finger 102, but the spring 100, being very weak, is not sufficiently strong to overcome the frictional engagement between the teeth 80 and 90 so that the pin will be retained in the position shown in Figure 8. If it is desired to reverse the copy to return to the line which has just been passed, the operator will slowly turn the handle 130 in the reverse position so that the weight of the segment and the copy sheets 10 will move the segment downwardly and carry the pin 88 therewith. The frictional engagement between the teeth 80 and 90 is still sufficient to hold the pin in the position shown in Figure 8. Because of the fact that the segment is out of balance, the pin 88 will be held in engagement with the teeth 80. In order to release the pin 88 and its tooth 90 from engagement with the teeth 80, the operator will turn the handle 130 quickly in the reverse direction so that the tooth 90 is suddenly pulled away from engagement with the teeth 80. This will enable the spring 100 to function and to push the pin 88 from the position shown in Figure 8 to that shown in Figure 9. The segment will then fall and return the segment part and pin 88 to the position shown in Figure 7.

I claim:

1. In a line spacing machine, a frame, a movable copy-holding segment, a stationary shield in front of the segment to enable the showing of one line of the copy at a time, means journally to mount the segment on the frame, a clutch on the said means, and means to operate the clutch to cause the segment to rise to advance the copy, said operating means being capable of releasing the clutch to enable the segment to fall.

2. In a line spacing machine, an upright frame, a raisable and lowerable copy-holding segment, a stationary shield in front of the segment to enable the showing of one line of copy at a time, a journally mounted shaft to which the segment is secured, a toothed wheel freely mounted on the shaft, a clutch element on the wheel, a second clutch element secured to the shaft, means to interconnect the clutch elements whereby the movement of the toothed wheel in one direction only will cause the raising of the segment to advance the copy, and means movable in one direction to operate the wheel to advance the copy, the movement of said operating means in the opposite direction causing the release of said interconnecting means to release the clutch and cause the segment to fall to its starting position.

3. In a line spacing machine, an upright frame, a shaft journaled in the frame, a shield, a copy holder behind the shield and secured to the shaft, said copy holder being movable up and down relative to the shield to display one line of the copy at a time, a clutch element secured to the shaft, a second clutch element freely mounted on the shaft, a pin frictionally interconnecting the two clutch elements, a spring tending constantly to urge said pin out of interconnecting engagement, said spring being of insufficient strength to overcome the force of frictional engagement, means to move one of the clutch elements to cause the rotation of the shaft and the movement of the copy holder when the pin interconnects the clutch elements, and means to cause the pin to connect the clutch elements when the copy holder is in its lowered position.

4. In a line spacing machine, an upright frame, a shaft journaled in the frame, a shield, a copy holder behind the shield and secured to the shaft, said copy holder being movable up and down relative to the shield to display one line of the copy at a time, a clutch element secured to the shaft, a second clutch element freely mounted on the shaft, a pin frictionally interconnecting the two clutch elements, a spring tending constantly to urge said pin out of interconnecting engagement, said spring being of insufficient strength to overcome the force of frictional engagement, means movable in one direction to move one of the clutch elements in one direction to cause the rotation of the shaft and the raising of the copy holder when the pin interconnects the clutch elements, the rapid movement of said means in the reverse direction causing the spring to move the pin to release the first element of the clutch and thereby enabling the copy holder to fall to its starting position, and means to cause the pin to connect the clutch elements when the copy holder is in its lowered position.

5. In a line spacing machine, an upright frame, a shaft journaled in the frame, a shield, a copy holder behind the shield and secured to the shaft, said copy holder being movable up and down relative to the shield to display one line of the copy at a time, a clutch element secured to the shaft, a second clutch element freely mounted on the shaft, teeth on one clutch element, a pin movably mounted in one clutch element and frictionally engaging the teeth on the other element, a spring tending constantly to urge said pin out of engagement with the teeth, said spring being of insufficient strength to overcome the force of frictional engagement, means to move one of the clutch elements to cause the rotation of the shaft and the movement of the holder when the pin interconnects the two clutch elements, and means to cause the pin to connect the clutch elements when the copy holder is in its lowered position.

6. In a line spacing machine, a frame, a shaft journaled in the frame, a copy holder rigid with the shaft, a shield in front of the copy holder enabling the showing of one line of copy at a time, a two-part clutch, one part being secured to the shaft and the other part turning freely thereon, one part of the clutch surrounding the other, teeth on one clutch part, a pin slidably mounted in the other clutch part and having a tooth adapted to engage between the teeth of the other clutch part, said pin being held against a tooth by frictional engagement, a spring tending constantly to urge said pin out of engagement with the other clutch member, said spring being of insufficient strength to overcome the force of frictional engagement, means to move the freely mounted clutch member thereby to cause the movement of the shaft and the holder to advance the copy over the shield to enable the operator to copy the exposed line, and means to cause the pin to connect the clutch elements when the copy holder is in its lowered position.

7. In a line spacing machine, a frame, a shaft journaled in the frame, a raisable and lowerable copy holder rigid with the shaft, a shield in front of the copy holder enabling the showing of one line of copy at a time, a two-part clutch, one part being secured to the shaft and the other part turning freely thereon, one part of the clutch surrounding the other, teeth on one clutch part, a pin slidably mounted in the other clutch part and having a tooth adapted to engage between the teeth of the other clutch part, said pin being held against a tooth by frictional engagement, a spring tending constantly to urge said pin out of engagement with the toothed clutch member, said spring being of insufficient strength to overcome the force of frictional engagement, means to move the freely mounted clutch member thereby to cause the movement of the shaft and the raising of the segment to advance the copy over the shield to enable the operator to copy the exposed line, the slow movement of said freely mounted clutch member in the reverse direction causing the movement of the copy holder in the reverse direction and the rapid reverse movement of the freely mounted clutch member causing the release of the pin from the toothed member to enable the copy holder to fall to its starting position, and means to cause the pin to connect the clutch elements when the copy holder is in its lowered position.

8. In a line spacing machine, a frame, a shaft journaled in the frame, a copy holder rigid with the shaft, a shield in front of the copy holder enabling the showing of one line of copy at a time, a two-part clutch, one part being secured to the shaft and the other part turning freely thereon, one part of the clutch surrounding the other, teeth on one clutch part, a pin slidably mounted in the other clutch part, said pin having a tooth adapted to engage between the teeth of the clutch part, said pin being held against a tooth by frictional engagement, a spring tending constantly to urge said pin out of engagement with the toothed clutch member, said spring being of insufficient strength to overcome the force of frictional engagement, means to move the freely mounted clutch member thereby to cause the movement of the shaft and the holder to advance the copy over the shield to enable the operator to copy the exposed line, the reverse movement of said means causing the release of the tooth to enable the copy-holder to fall to its starting position and means on the frame adapted to engage the pin on the return movement of the copy holder to cause the tooth of the pin to engage the toothed clutch part.

GEORGE H. BOYD.